(12) United States Patent
Hausman et al.

(10) Patent No.: US 10,661,146 B2
(45) Date of Patent: May 26, 2020

(54) METHOD AND APPARATUS FOR PROVIDING HAZARD INFORMATION

(71) Applicant: TomTom International B.V., Amsterdam (NL)

(72) Inventors: Nicholas Hausman, Amsterdam (NL); David Morgan, Amsterdam (NL)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 165 days.

(21) Appl. No.: 15/735,099

(22) PCT Filed: Jun. 8, 2016

(86) PCT No.: PCT/EP2016/062999
§ 371 (c)(1),
(2) Date: Dec. 8, 2017

(87) PCT Pub. No.: WO2016/198438
PCT Pub. Date: Dec. 15, 2016

(65) Prior Publication Data
US 2018/0353837 A1 Dec. 13, 2018

(30) Foreign Application Priority Data
Jun. 8, 2015 (GB) .................................. 1509923.7

(51) Int. Cl.
*A63B 71/06* (2006.01)
*G06F 16/29* (2019.01)
(Continued)

(52) U.S. Cl.
CPC ............ *A63B 71/06* (2013.01); *G01C 21/005* (2013.01); *G06F 1/163* (2013.01); *G06F 16/29* (2019.01);
(Continued)

(58) Field of Classification Search
CPC .......... A63B 71/06–0697; A63B 57/00; A63B 2071/0691; A63B 2102/32;
(Continued)

(56) References Cited

U.S. PATENT DOCUMENTS 4,703,444 A * 10/1987 Storms, Jr. ............. A63B 69/36
342/451
5,873,797 A 2/1999 Garn
(Continued)

FOREIGN PATENT DOCUMENTS

CN 1412525 A 4/2003
CN 101952687 A 1/2011

OTHER PUBLICATIONS

Search Report of United Kingdom application No. GB1509923.7 dated Nov. 18, 2015.
(Continued)

*Primary Examiner* — Jasson H Yoo

(57) ABSTRACT

Embodiments of the present invention provide a method of providing hazard information by an electronic device, comprising determining: determining a location of an electronic device in relation to hazards in a geographic region of interest, the location of the electronic device being determined by a location determining unit of the electronic device and the location of the hazards being determined from map data accessible to the electronic device; displaying, in a first display mode on a display of the electronic device, an indication of the hazards in the geographic region of interest in relation to a scale indicative of a distance from the location of the electronic device; and displaying, in response to a predetermined user input, in a second display mode on the display, an indication of one or more of the hazards in a portion of the geographic region of interest, each indication being associated with at least one item of distance informa-
(Continued)

tion indicative of a distance of the hazard from the location of the electronic device.

15 Claims, 8 Drawing Sheets

(51) Int. Cl.
G01C 21/00 (2006.01)
G06F 1/16 (2006.01)
H04W 4/021 (2018.01)
A63B 102/32 (2015.01)

(52) U.S. Cl.
CPC ..... *H04W 4/021* (2013.01); *A63B 2071/0691* (2013.01); *A63B 2102/32* (2015.10); *A63B 2220/13* (2013.01)

(58) Field of Classification Search
CPC ..... A63B 2220/13; G06F 13/29; G06F 1/163; G06F 16/29; G01C 21/005
See application file for complete search history.

(56) References Cited

U.S. PATENT DOCUMENTS

| | | | |
|---|---|---|---|
| 2003/0103001 A1* | 6/2003 | Huston | G01S 19/19 342/357.25 |
| 2009/0075761 A1* | 3/2009 | Balardeta | A63B 57/00 473/407 |
| 2009/0258733 A1 | 10/2009 | Liu et al. | |
| 2010/0130298 A1* | 5/2010 | Dugan | A63B 69/3623 473/223 |
| 2010/0179005 A1 | 7/2010 | Meadows et al. | |
| 2010/0311523 A1 | 12/2010 | Balardeta et al. | |
| 2015/0057107 A1 | 2/2015 | Leech | |
| 2015/0105173 A1 | 4/2015 | Thurman et al. | |

OTHER PUBLICATIONS

International Search Report of international application No. PCT/EP2016/062999 dated Aug. 30, 2016.

* cited by examiner

METHOD AND APPARATUS FOR PROVIDING HAZARD INFORMATION

CROSS-REFERENCE TO RELATED APPLICATIONS

The present application is a National Stage of International Application No. PCT/EP2016/062999, filed on Jun. 8, 2016, and designating the United States, which claims benefit to British patent application 1509923.7 filed on Jun. 8, 2015. The entire content of these applications is incorporated herein by reference.

FIELD OF THE INVENTION

Embodiments of the invention relate to electronic devices with a location determining capability which provide information indicative of hazards to a user. In particular, in some embodiments, the electronic device may be a sports device arranged to provide information of hazards encountered when playing or carrying out a sport, such as golf, cycling, running, kayaking, etc.

BACKGROUND OF THE INVENTION

In recent years GPS devices have started to be used for outdoor applications. For example, fitness watches that include GPS receivers have started to be used by golfers, joggers, runners, cyclists and other athletes and outdoor enthusiasts as a means to provide information related to the activity or sport concerned such as real-time data indicative of their speed, distance travelled, etc. In some situations, it is desired to provide information indicative of hazards to be encountered when involved in the activity or sport. For example, in the game of golf, hazards which may be encountered include sand and water hazards located around a golf course. However it is difficult, especially when the device is relatively small such as a wrist-worn device, to provide information associated with the hazard to the user in a convenient manner. Such difficulty may be encountered when attempting to provide the user with information indicative of hazards generally in a region of interest, such as a golf course, whilst providing detailed information related to the hazards, such as distance information.

It is desired, in at least embodiments of the present invention, to provide a method of efficiently providing information indicative of hazards to a user on an electronic device, and which at least mitigates one or more problems found in existing devices.

SUMMARY OF THE INVENTION

According to an aspect of the invention, there is provided a method of providing hazard information by an electronic device, comprising:

determining a location of an electronic device in relation to hazards in a geographic region of interest, the location of the electronic device being determined by a location determining unit of the electronic device and the location of the hazards being determined from map data accessible to the electronic device;

displaying, in a first display mode on a display of the electronic device, an indication of the hazards in the geographic region of interest in relation to a scale indicative of a distance from the location of the electronic device; and displaying, in response to a predetermined user input, in a second display mode on the display, an indication of one or more of the hazards in a portion of the geographic region of interest, each indication being associated with at least one item of distance information indicative of a distance of the hazard from the location of the electronic device.

The method advantageously allows the user to generally appreciate the location of hazards in the region of interest with an approximate indication of distance to each hazard being provided by the scale, whilst in the second mode the user is able to appreciate in more detail the precise distance to each hazard.

The present invention extends to an electronic device for carrying out a method in accordance with any of the aspects or embodiments of the invention herein described.

Thus, in accordance with another aspect of the invention there is provided an electronic device, comprising:

means for determining a location of the electronic device in relation to hazards in a geographic region of interest, the location of the hazards being determined from map data accessible to the electronic device;

means for displaying, in a first display mode on a display of the electronic device, an indication of the hazards in the geographic region of interest in relation to a scale indicative of a distance from the location of the electronic device; and means for displaying, in response to a predetermined user input on a input receiving means of the electronic device, in a second display mode on the display, an indication of one or more of the hazards in a portion of the geographic region of interest, each indication being associated with at least one item of distance information indicative of a distance of the hazard from the location of the electronic device.

As will be appreciated by those skilled in the art, this further aspect of the present invention can and preferably does include any one or more or all of the preferred and optional features of the invention described herein in respect of any of the other aspects of the invention, as appropriate. If not explicitly stated, the electronic device of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

The electronic device of the present invention in any of its embodiments may be, and preferably is, a mobile device. In embodiments, the mobile device can be arranged so as to be carried by the user, such as being attached to the user's arm or wrist, or simply by being placed in a pocket or other suitable receptacle (e.g. a specially designed holder or case). Alternatively, the mobile device can be arranged so as to be transported. For example, the mobile device can be attached to a vehicle being used by the user, e.g. a golf cart, bicycle, canoe, kayak or other similar vehicle. The mobile device could also be attached to an object being pushed or pulled by a user, such as a golf trolley or the like.

The electronic device comprises means for determining a location of the electronic device in relation to hazards in a geographic region of interest. In embodiments, the device comprises means for determining a current geographic location of the device, which can then be used to determine the relative location of the device to the hazards in the geographic reason of interest. The location determining means can comprise any suitable device as desired. For example, latitude and longitude coordinates can be determined using devices that can access and receive information from WiFi access points or cellular communication networks. Preferably, however, the location determining means comprises a global navigation satellite systems (GNSS) receiver, such as a GPS receiver, for receiving satellite signals indicating the position (and optionally speed) of the receiver (and thus user) at a particular point in time, and which receives updated position (and optionally speed) information at regular intervals.

The electronic device of the present invention is arranged to access map data that includes data indicative of the location of the plurality of hazards in the geographic region. The map data can be stored in a data storage means of the electronic device. Additionally, or alternatively, the map data can be stored remotely from the electronic device, e.g. at a server, and the electronic device is arranged to obtain the map data as desired over a, wired or wireless, communication channel.

The electronic device comprises a display device for providing information to the user, such as information concerning the location of one or more of the hazards in the geographic region relative to the location of the electronic device. The display device can include any type of display screen, such as an LCD display, e.g. that can display both text and graphical information.

The electronic device further comprises one or more input means to allow the user to select one or more functions of the device and/or to input information to the device, such as to display particular information on the display. The input means can comprise one or more buttons, switches or the like, a touch sensitive device and/or any other suitable device. The input means and the display device could be integrated into an integrated input and display device, such as a touch screen display, so that a user need only touch a portion of the display to select one of a plurality of display choices or to activate a virtual button or buttons. The input means may additionally or alternatively comprise a microphone and software for receiving input voice commands as well.

As discussed above, in a first display mode, an indication of the hazards in the geographic region of interest in relation to a scale indicative of a distance from the location of the electronic device. The indication of each hazard may be indicative of a hazard type. The indication of the hazards may be a schematic representation of the hazards in the geographic region. The indication of the one or more hazards may be arranged in the display relative to a path through the region of interest. The region of interest may comprise a fairway of a golf course, and the path may correspond to a centreline of the fairway. The scale may comprise a plurality of items of distance information spaced at regular intervals indicative of a respective distance from the location of the electronic device; in other words the scale is preferably a numerical scale.

In response to a predetermined user input, e.g. a touch action, the first display mode preferably transitions to the second display mode. In the second display mode, an indication of one or more of the hazards in a portion of the geographic region of interest is displayed, each indication being associated with at least one item of distance information indicative of a distance of the hazard from the location of the electronic device. In the second mode, a viewing scale of the displayed region of interest may be increased with respect to the first mode, i.e. the transition from the first mode to the second mode preferably involves zooming into a portion of the geographic region. The viewing scale may be increased by a predetermined amount in response to the user input; the increase in viewing scale allows detail of the portion of the geographic region to be appreciated in the second mode. The portion of the geographic region of interest displayed in the second mode may be any portion of the geographic region as desired. For example, in preferred embodiment, the portion comprises a generally central portion of the region of interest displayed in the first mode. The method may comprise selecting a location of the portion of the geographic region of interest displayed in the second mode from within the region of interest displayed in the first mode; optionally the location is selected such that at least a predetermined number of hazards are located within the portion, e.g. at least one hazard. Advantageously the location of the portion of the geographic region of interest displayed in the second mode is selected such that it is not empty and, in some embodiments, this includes a maximum number of hazards.

The at least one item of distance information may be indicative of a distance of one or more of a front, a middle, and a rear of the respective hazard from the location of the electronic device. In other words, the at least one item of distance information provides a precise distance to the respective part of the associated hazard from the location of the electronic device. An indication of a hazard in the second mode may be associated with a plurality of items of distance information; the display of the plurality of items of distance information allows the user to appreciate in the second mode one or more size characteristics of the respective hazard. In some embodiments in the second mode the distance information is displayed proximal to the indication of respective hazard. In the second mode the distance information may be arranged to at least partly overlie to the indication of the respective hazard. The display of the distance information either proximal to or overlying at least partly the indication of the respective hazard allows a number of indications of hazards to be displayed simultaneously, especially with an increased magnification. The distance information may be a numerical value indicative of the distance from the location of the electronic device.

In some embodiments the method comprises returning to the first display mode in response to receiving a second user input whilst in the second display mode, wherein in the first display mode the indication of the one or more hazards in the region of interest are displayed in relation to the scale indicative of the distance from the location of the electronic device.

The methods in accordance with the present invention may be implemented at least partially using software, e.g. computer programs. The present invention thus also extends to a computer program comprising computer readable instructions executable to perform a method according to any of the aspects or embodiments of the invention.

The invention thus also extends to a computer software carrier comprising software which when used to operate a system or apparatus comprising data processing means causes, in conjunction with said data processing means, said apparatus or system to carry out the steps of the methods of the present invention. Such a computer software carrier could be a non-transitory physical storage medium, such as a ROM chip, CD ROM or disk, or could be a signal, such as an electronic signal over wires, an optical signal or a radio signal such as to a satellite or the like. The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described by way of example only, with reference to the accompanying figures, in which.

DETAILED DESCRIPTION OF THE DRAWINGS

Embodiments of the invention relate to an electronic device having a location determining capability which is arranged to operatively display hazard information. Preferred embodiments of the present invention will now be described with particular reference to a fitness or sports watch having access to global navigation satellite system (GNSS) data, such as Global Positioning System (GPS) data. Fitness or sports watches of the type described are often worn by athletes to help them during their activities, such as about a wrist of the user. It will be appreciated, however, that the device could be arranged to be carried by a user or connected or "docked" in a known manner to a vehicle such as a bicycle, kayak, or the like. The hazard information relates to a geographic area of interest as defined in map data which is accessible to the device.

Figure 1:
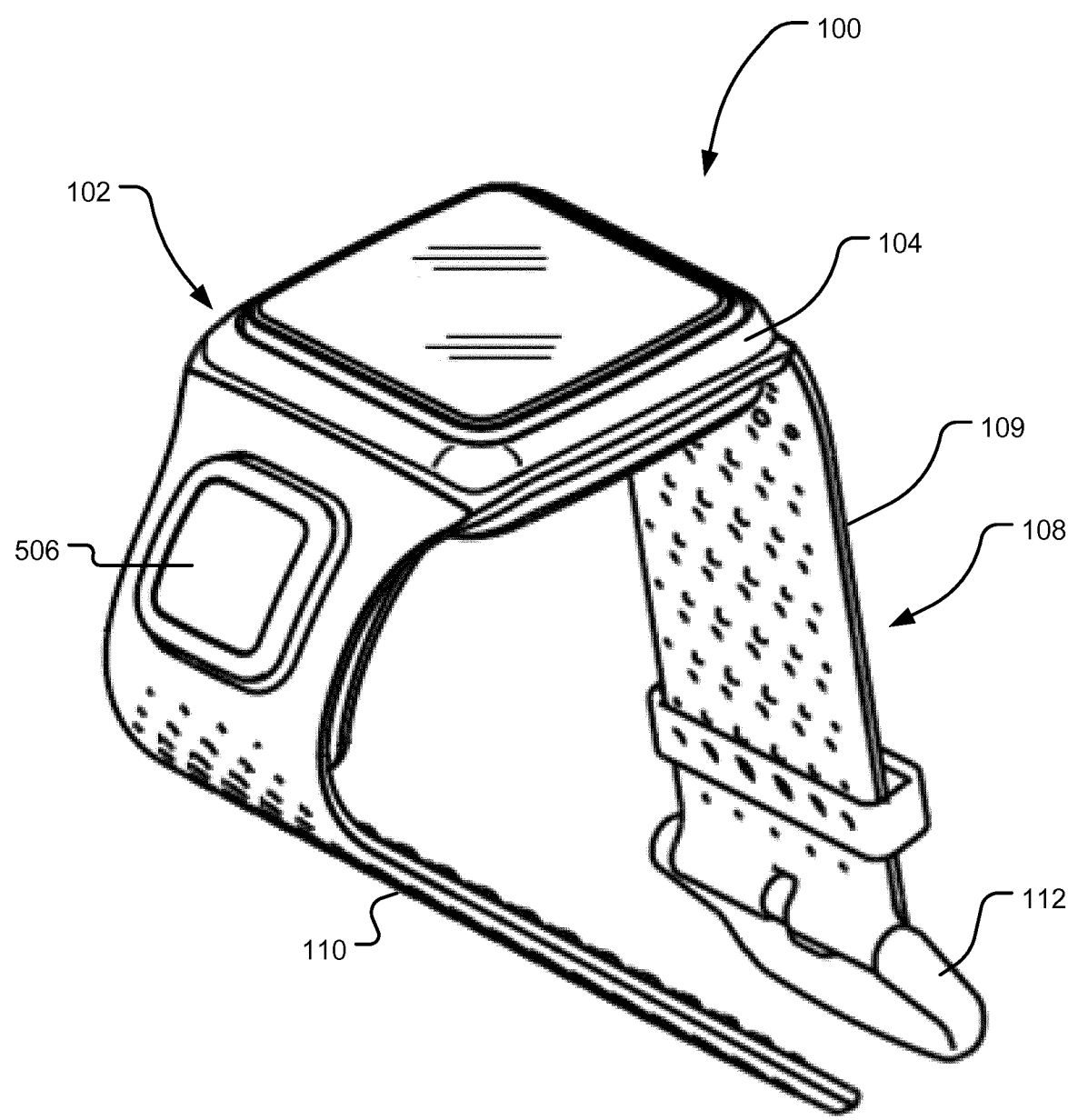
FIG. 1 shows an illustration of an electronic device according to an embodiment of the invention.

FIG. 1 shows a perspective view of a fitness watch 100 according to an embodiment of the present invention. The watch 102 comprises a module that can be inserted into a plurality of different docking solutions. A watch casing 102 comprises a display housing 104 and a user interface 106, which are spaced apart from each other. In the embodiment depicted in FIG. 1 the watch casing 102 is inserted into an aperture in a strap 108; the strap 108 being wearable on the wrist of a user to create the fitness watch 100. As will be appreciated, the user interface portion 106 of the watch casing 100 is arranged to pass through a first aperture, and the display housing portion 104 is arranged to pass through a second aperture. The strap 108 is formed of two parts 109, 110 that connect to each other by a buckle 112, in the conventional way. Cooperating projections and recesses on the watch casing 100 and the strap 108 allow the watch casing 100 to releasably engage and be maintained in position within the strap 108. Whilst the watch 100 illustrated in FIG. 1 shows the display housing 104 and the user interface 106 being separate it will be realised that embodiments are not limited in this respect. Embodiments of the invention may be envisaged wherein the display and user interface are integrated. The user interface may be provided in the form of a touch-sensitive display device, as will be appreciated. The display device may comprise a capacitance based touch sensor. Furthermore it will be realised that the electronic device may be other than a watch.

Figure 2:
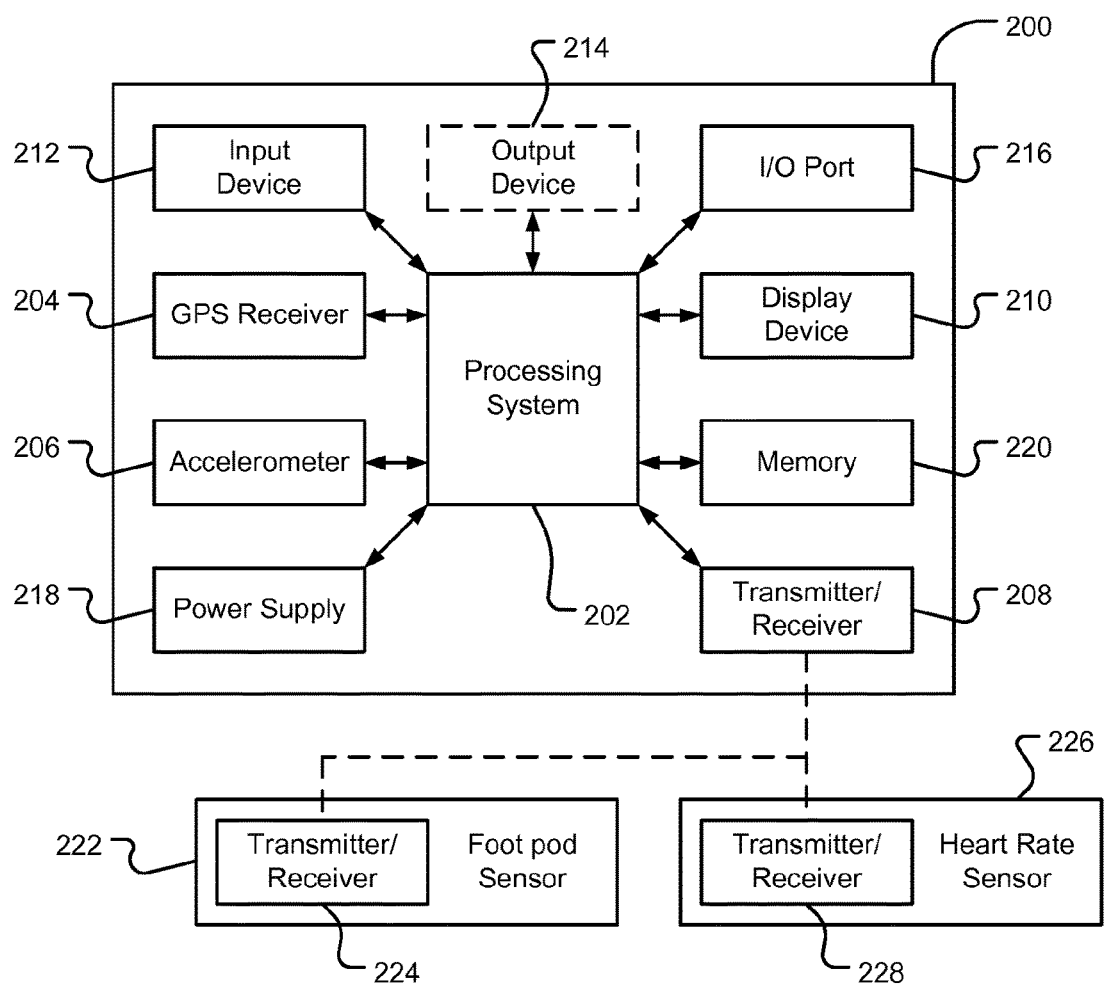
FIG. 2 shows a schematic illustration of an electronic device according to an embodiment of the invention.

FIG. 2 is an illustrative representation of electronic components of the electronic device 200, such as the fitness or sports watch 100, according to an embodiment of the present invention, in block component format. It should be noted that the block diagram of the device 200 is not inclusive of all components of the device 200, but is only representative of many example components.

The device 200 includes a processor 202 connected to one or more input devices 212, such as a touch sensor (which can be capacitive or resistive based), a depressible touchpad (or trackpad) and/or a button having one or more depressible portions, and a display screen 210, such as an LCD display. The device 200 can further include an output device such as a speaker or sounder arranged to provide audible information to a user, such as alerts that a certain speed has been reached or a certain distance has been travelled.

FIG. 2 further illustrates an operative connection between the processor 202 and a GPS antenna/receiver 204. Although the antenna and receiver are combined schematically for illustration, the antenna and receiver may be separately located components. The antenna may be of any suitable form, but in preferred embodiments is a GPS patch antenna. The GPS antenna/receiver 204 provides the location determining capability of the device 200. It will be realised that embodiments of the invention are not restricted to GPS. The location of the device 200 may be determined by other satellite-based systems, such as GLONASS or Galileo.

The device 200 can further includes an accelerometer 206, which can be a 3-axis accelerometer arranged to detect accelerations of the user in x, y and z directions. The accelerometer 206 may act as a pedometer for use when/if there is a loss of GPS reception. Although the accelerometer 206 is shown to be located within the device 200, the accelerometer 206 may also be an external sensor worn or carried by the user, and which transmits data to the device 200 via the transmitter/receiver 208.

The device 200 may also receive data from other sensors, such as a foot pod sensor 222 and a heart rate sensor 226. The foot pod sensor may, for example, be a piezoelectric or micro-electro-mechanical systems (MEMS) accelerometer that is located in or on the sole of the user's shoe. Each external sensor may be provided with a transmitter and receiver, 224 and 228 respectively, which can be used to send or receive data to the device 200 via the transmitter/receiver 208.

The processor 202 is operatively coupled to a memory 220. The memory 220 may comprise, for example, a volatile memory, such as a Random Access Memory (RAM), and/or a non-volatile memory, for example a digital memory, such as a flash memory. The memory 220 may be removable. The memory 220 may also be operatively coupled to the GPS receiver 204, the accelerometer 206 and the transmitter/receiver 208 for storing data obtained from these sensors and devices.

Further, it will be understood by one of ordinary skill in the art that the electronic components shown in FIG. 2 are powered by a power source 218 in a conventional manner. The power source 218 may be a rechargeable battery.

The device 200 further includes an input/output (I/O) device 216, such as a plurality of electrical contacts or a USB connector. The I/O device 216 is operatively coupled to the processor 202, and also at least to the memory 220 and power supply 218. The I/O device 216 is used, for example, to: update firmware of processor 220, sensors, etc; transfer data stored on the memory 220 to an external computing resource, such as a personal computer or a remote server; and recharge the power supply 218 of the device 200. Data could, in other embodiments, also be sent or received by the device 200 over the air using any suitable mobile telecommunication means.

As will be understood by one of ordinary skill in the art, different configurations of the components shown in FIG. 2 are considered to be within the scope of the present application. For example, the components shown in FIG. 2 may be in communication with one another via wired and/or wireless connections and the like.

Figure 3:
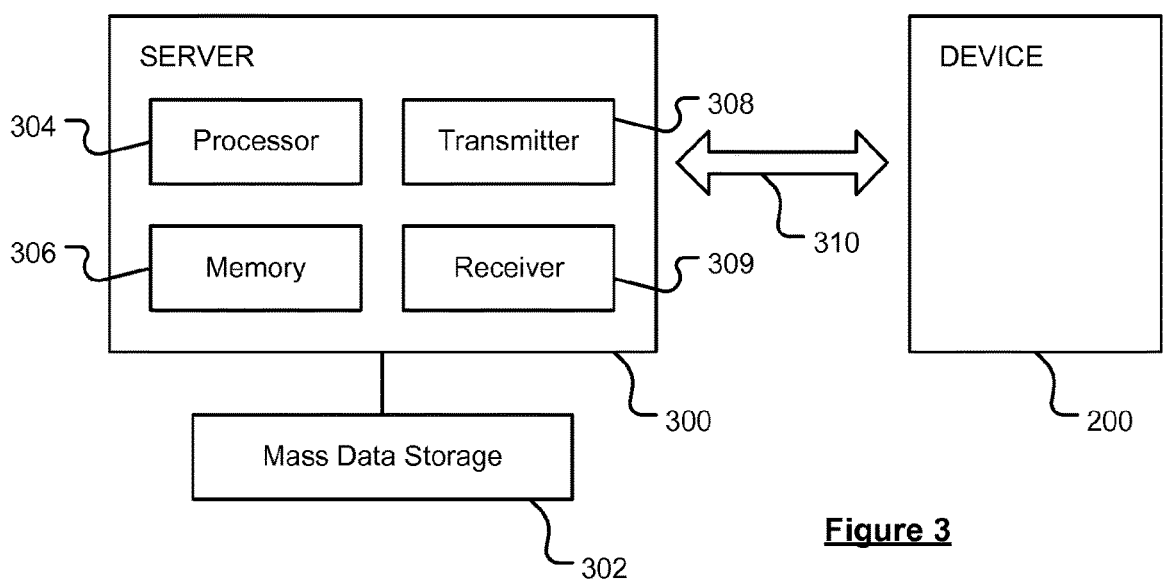
FIG. 3 shows an illustration of a system according to an embodiment of the invention.

In FIG. 3 the device 200 is depicted as being in communication with a server 300 via a generic communications channel 310 that can be implemented by any number of different arrangements. The server 300 and device 200 can communicate when a connection is established between the server 300 and the device 200 (noting that such a connection can be a data connection via mobile device, a direct connection via personal computer via the internet, etc.).

The server 300 includes, in addition to other components which may not be illustrated, a processor 304 operatively connected to a memory 306 and further operatively connected, via a wired or wireless connection, to a mass data storage device 302. The processor 304 is further operatively connected to transmitter 308 and receiver 309, to transmit and send information to and from device 200 via communications channel 310. The signals sent and received may include data, communication, and/or other propagated signals. The functions of transmitter 308 and receiver 309 may be combined into a signal transceiver.

The communication channel 310 is not limited to a particular communication technology. Additionally, the communication channel 310 is not limited to a single communication technology; that is, the channel 310 may include several communication links that use a variety of technology. For example, the communication channel 310 can be adapted to provide a path for electrical, optical, and/or electromagnetic communications, etc. As such, the communication channel 310 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 310 can include intermediate devices such as routers, repeaters, buffers, transmitters, and receivers, for example.

In one illustrative arrangement, the communication channel 310 includes telephone and computer networks. Furthermore, the communication channel 310 may be capable of accommodating wireless communication such as radio frequency, microwave frequency, infrared communication, etc. Additionally, the communication channel 310 can accommodate satellite communication.

The server 300 may be a remote server accessible by the device 200 via a wireless channel. The server 300 may include a network server located on a local area network (LAN), wide area network (WAN), virtual private network (VPN), etc.

The server 300 may include a personal computer such as a desktop or laptop computer, and the communication channel 310 may be a cable connected between the personal computer and the device 200. Alternatively, a personal computer may be connected between the device 200 and the server 300 to establish an internet connection between the server 300 and the device 200. Alternatively, a mobile telephone or other handheld device may establish a wireless connection to the internet, for connecting the device 200 to the server 300 via the internet.

The server 300 is further connected to (or includes) the mass storage device 302. In some embodiments the mass storage device 302 contains a store of at least digital map information.

In some embodiments the electronic device 200 is an electronic golf device, as will be explained. The electronic golf device 200 is arranged to output a changeable computer generated icon on the display device 210. The device 200 is arranged to provide information to a user (or golfer) in respect of a hole of a golf course currently being played. In some embodiment the electronic device 200 comprises a data store storing map data representative of the location and layout of one or more golf courses. Alternatively the map data may be stored at the server 300, such as in the mass storage 302, to be accessible to the device 200.

Golf courses comprise a series of holes, typically either 9 holes or 18 holes, each hole comprising a teeing ground (from which the golf ball is first struck), a fairway and a putting green (or "green") with a flagstick (or "pin") and hole (or "cup"). Holes will typically include one or more hazards, e.g. water (such as ponds, lakes and rivers), sand (commonly referred to as bunkers), and even rock on some courses. Hazards can be located along the fairway and can also often be found around the green. Hazards can typically be categorised as either: carry hazards—obstacles that can't be avoided by the golfer, and when hit into, would cause the golfer to take a stroke; or regular hazards—obstacles that the golfer can hit around. While many holes are designed with a direct line-of-sight from the teeing ground to the green, a hole may bend either to the left or to the right. This bend is called a "dogleg"; the hole is called a "dogleg left" if the hole angles to the left, and a "dogleg right" if the hole angles to the right. Some holes may even bend twice, and are called "double dogleg".

Embodiments of the invention provide a method of displaying a representation of hazards to the user of the device. The method may comprise schematically displaying the location, type and size of at least some of the hazards on a hole of the course.

Graphical representations of hazards may be displayed using a grid system to indicate position relative to a centreline of the fairway, range relative to a current position of the device 200 and size of a hazard. In addition, through the use of different graphical icons it becomes possible to identify different types of hazards.

A display window of the display, corresponding to display device 210, which is used to display information, may be divided into a predetermined number of columns, such as five columns, and a predetermined number of rows. As will be explained, in one display mode an outermost column is used to display numerical values and the remaining columns are used display icons indicative of hazards. Each row preferably represents a distance range from the current position of the device to the hazard. For example, in one mode if 6 rows are used, the bottom row, row 1, can represent 1-50 yards (or meters), row 2 can represent 51-100 yards (or meters), row 3 can represent 101-150 yards (or meters), row 4 can represent 151-200 yards (or meters), row 5 can represent 210-250 yards (or meters) and the top row, row 6, can represent 251-300 yards (or meters). The central three columns represent 'left', 'middle' and 'right' columns, with the appropriate column or columns being used dependent on the relative position of a hazard to a centreline of the fairway. As the golfer, i.e. the device 200, progresses along the fairway, the hazards displayed in the display window will be updated as appropriate, such that the user will always see the hazards on the course in front of their current position on the course.

It will be realised that embodiments of the invention are not limited to golf devices. The electronic device may be, more generally, an electronic device suitable for a variety of sports, e.g. running, particularly trail or off-road running, cycling, particularly mountain or off-road biking, or canoeing or kayaking. In such sports a path is travelled, which may correspond to a running or cycling trail or a river or stream, during which a variety of hazards may be encountered such as rocks, drops, steps, rapids white water, etc. It will be realised that this list of hazards is not limiting. When used for other sports the middle column of the display may correspond to the path to be followed, such as a trail, course or river. In these embodiments a hazard represents a feature of which the user needs to be aware of, or to pay attention to, during the activity.

Figure 4:
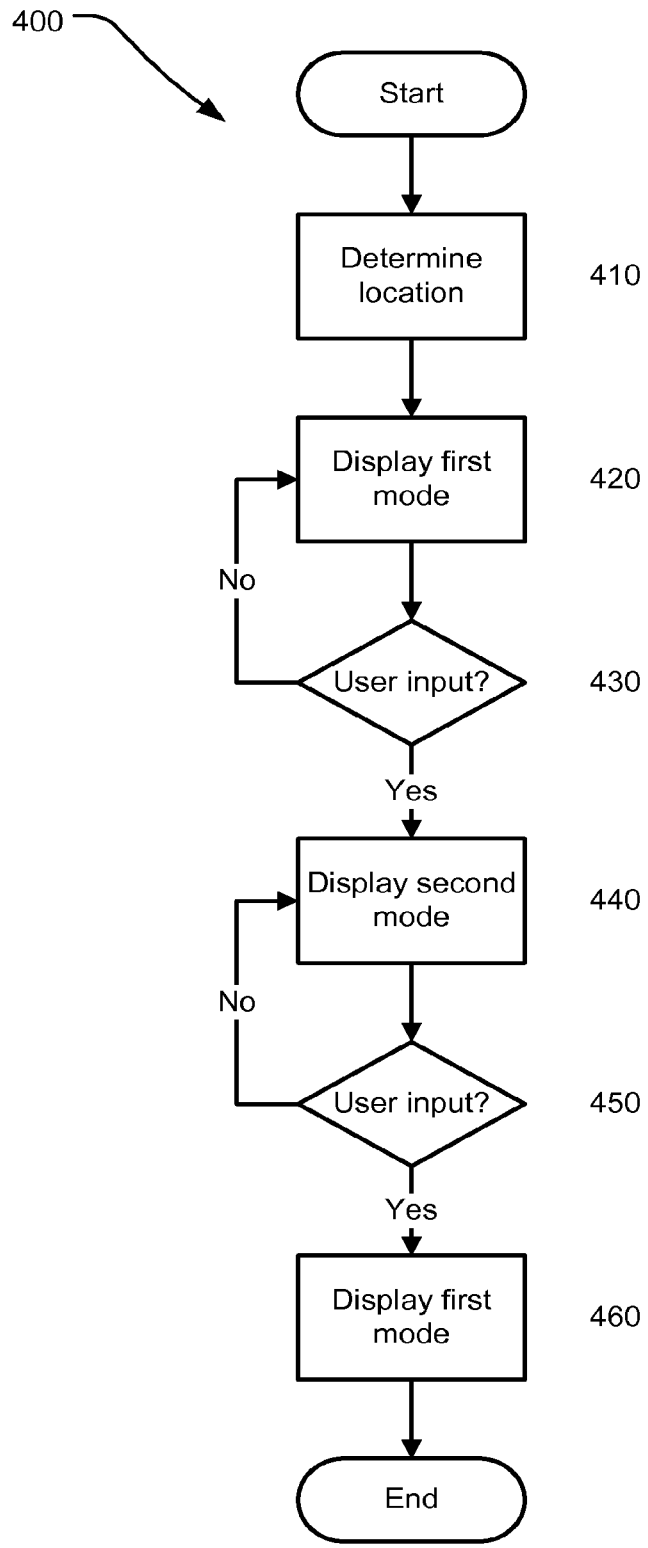
FIG. 4 shows an illustration of a method according to an embodiment of the invention.
Figure 5:
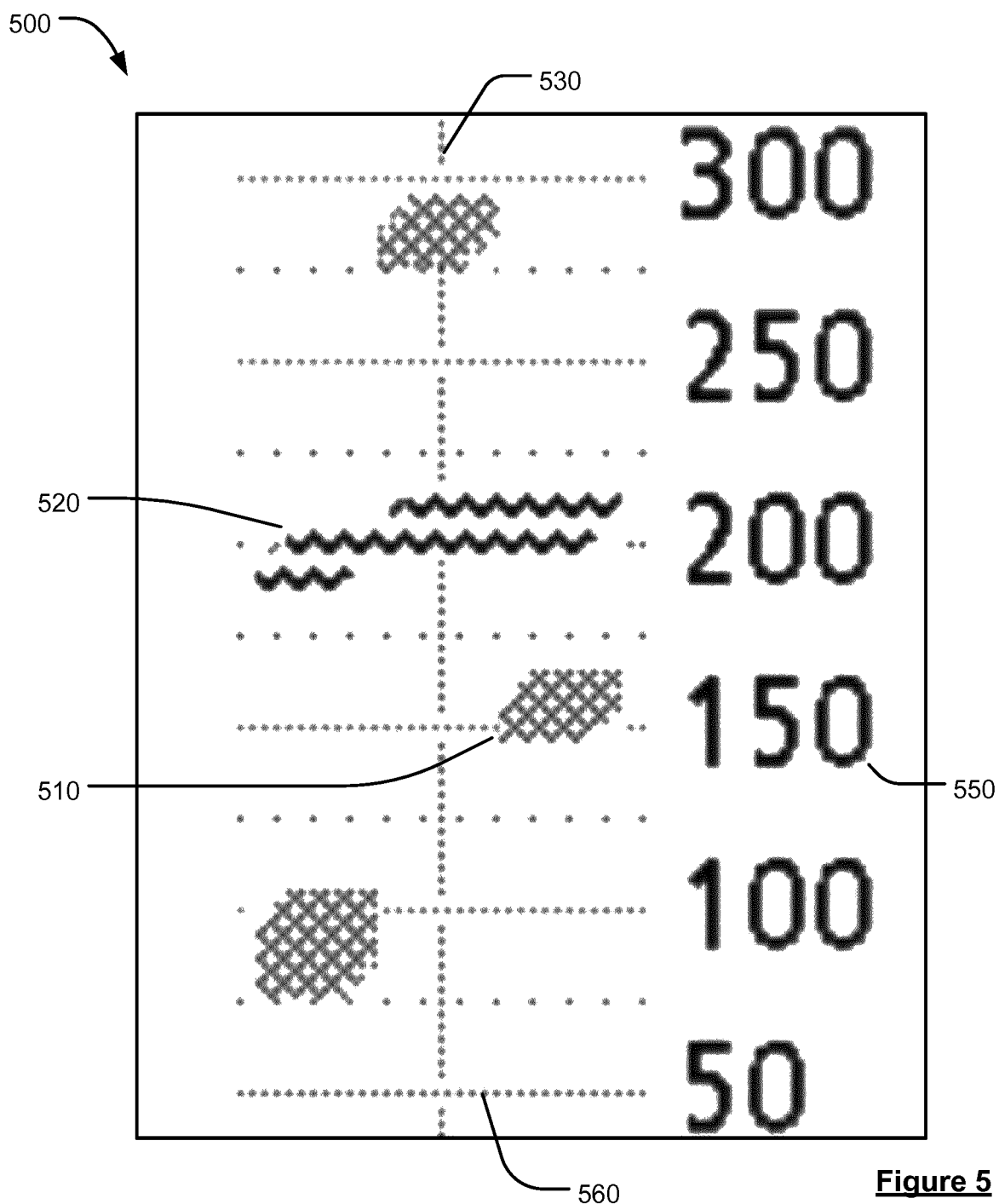
FIG. 5 illustrates a display of hazard information in a first mode according to an embodiment of the invention.
Figure 6:
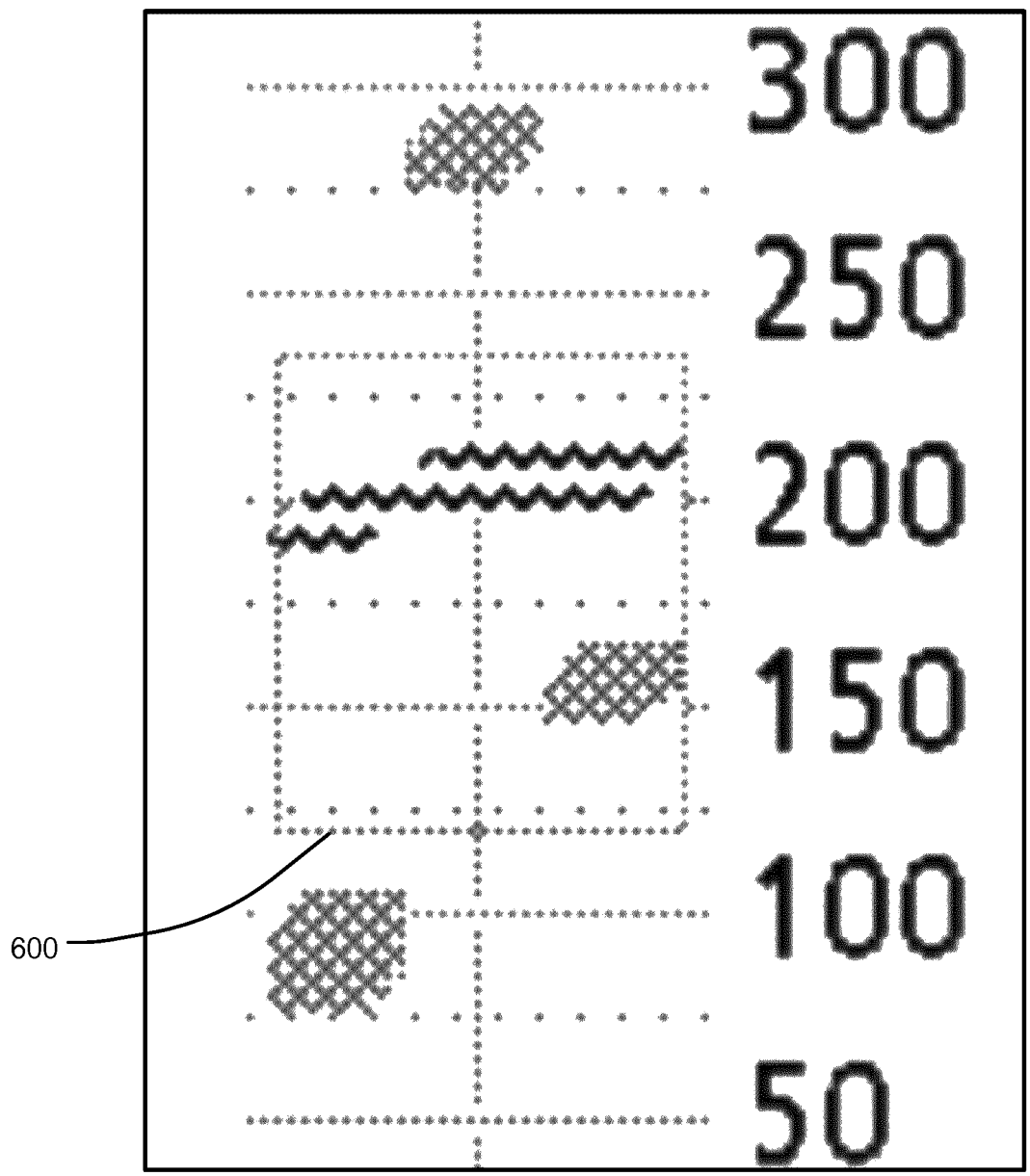
FIG. 6 illustrates a display of hazard information in a transition between a first mode and a second mode according to an embodiment of the invention.

FIG. 4 illustrates a method 400 of providing hazard information according to an embodiment of the invention. The method 400 will be explained with reference to FIGS. 5 to 7 which illustrate exemplary screenshots output on the display device 210 according to embodiments of the invention. In particular, FIG. 5 illustrates an output of the display device 210 in a first mode, FIG. 7 illustrates an output of the display device 210 whilst in a second display mode and FIG. 6 illustrates a transition between the first and second modes.

Referring to FIG. 4, the method 400 comprises a step 410 of the electronic device 200 determining its geographic location. The geographic location of the device 200 is determined by a location determining unit based on received wireless signals. The location determining unit may correspond to the GPS receiver 204 illustrated in FIG. 2, although it will be realised that embodiments of the invention are not limited in this respect. The location of the device 200 may be determined as a longitude and latitude of the device 200 upon the earth's surface, or at least within one or more regions corresponding to stored digital map data.

In step 410 the location of the device 200 is determined with respect to one or more hazards in a geographic region of interest. The location of the one or more hazards is determined by the processor 202 from map data accessible to the device 200. The map data may be stored in the memory 220 of the device. The region of interest corresponds at least to part of an area in which a sport is to be carried out.

In some embodiments the region of interest corresponds to a golf course. The map data is at least indicative of the location of the one or more hazards, such as sand traps, rocks, ponds, lakes and rivers, within the region of interest. The map data may also identify areas within the region of interest relevant to the sport such as one or more of fairways, rough, doglegs, greens and holes. Thus based on the location of the device 200 and the location of the one or more hazards determined from the map data the processing system 202 is able to determine a distance to each hazard.

In step 420 a representation of one or more hazards in the region of interest is displayed on the display device 210. The representations of the one or more hazards may be displayed within a display window of the display device 210. Each representation may be a schematic representation indicative of a type of hazard to be encountered. It will be realised that the region of interest represented on the display device 210 may not be the entirety of the region of interest for which map data is available. For example, the displayed region of interest may be up to a predetermined distance from the location of the device, such as up to approximately 300 yards (or metres) as shown in FIG. 5, although it will be realised that this distance is exemplary, or up to a predetermined number of hazards may be displayed, such as six, although it will be realised that this number is exemplary. Thus the representation displayed in the first mode may be of the hazards closest to the location of the device 200. In the first mode the displayed region may be moved according to user input, i.e. scrolled, to display graphical representations of hazards located at a further distance from the location of the device, i.e. so that closest hazards are not contained within the visual output of the display device 210.

Referring to FIG. 5, an output 500 of the display window of the display device 210 in the first mode according to an embodiment of the invention is illustrated. The display comprises graphical illustrations representative of a plurality of hazards. In particular, first 510 and second 520 hazards are illustrated. The display comprises further hazards although these are not specifically indicated for clarity. The graphical illustration of each hazard is indicative of a type of the hazard, such as the first hazard 510 being a bunker, and the second hazard being a river. The graphical illustration of the first hazard 510 is arranged at a right-hand side of a linear path indicated by line 530 in the display 500. The path 530 may be representative of the centreline of the fairway, as noted above. The illustration of the first hazard 510 may be located in a column to the right of the line 530 as discussed above. The graphical illustration of the second hazard 520 is arranged across the display indicative of the hazard generally spanning the region of interest. The illustration of the second hazard 520 is arranged in a plurality of columns, i.e. to the left, right and corresponding to the centreline 530.

In the first mode the graphical illustrations of the one or more hazards 510, 520 are displayed in relation to a (numerical) scale 550 indicative of a distance from the location of the electronic device 200. In the embodiment illustrated in FIG. 5 the scale 550 is arranged at a right-hand side of the display 500, in a right-most column thereof, however it will be realised that this is merely illustrative. The scale 550 comprises a plurality of markers arranged at regular intervals to denote unit distances from the location of the device 200. The markers in FIG. 5 are numerical values each indicative of a respective distance. The numerical values are arranged in the illustrated embodiment at 50 yard (or metre) intervals from the location of the device 200, although it will be realised that this is exemplary. Corresponding to each marker an indication 560 of the distance is arranged in relation to the columns associated with the geographic area. The indication in FIG. 5 is a line 560 which is arranged horizontally next to each marker to aid with visually depicting the distance to the illustrations of the one or more hazards. The line 560 is arranged to occupy a respective row of the display 500. As can be appreciated from FIG. 5, the illustrations of the one or more hazards 510, 520 are arranged proximal to the scale 550 such that the user of the device 200 is able to generally estimate the distance to the respective hazard 510, 520 and a length or size of the hazard based on the numerical values. Whilst the output of display 210 in the first mode allows the user to appreciate the presence of hazards 510, 520 in the region of interest, it can be difficult for the user to appreciate precise details of each of the hazards 510, 520. Furthermore, since a size of the display device 210 is generally limited on such an electronic device, particularly where the device 200 is a watch, it is not possible to substantially increase the size of the display device 210.

Step 430 comprises determining whether a predetermined user input is received by the device 200. In order to select the second mode, when the device 200 is operative in the first mode, a predetermined user input is received at the device 200. The user input may be received at the user interface 106, or may be received at the display device 210 in embodiments where the display device 210 is touch-sensitive. The user input may comprise the user touching or pressing on the user interface 106 or display device. The touch may be determined to have a duration of between predetermined time limits such as one or both of a minimum and a maximum duration. Advantageously the user input is relatively simple in nature and allows the device 200 to be operated to switch between the first and second moves conveniently when engaged in sport. In some embodiments the user input substantially covers an area of the user interface 106 or display device 210 such as a user placing their palm or hand on the user interface 106 or display device 210, and in so doing contact or otherwise interact with the touch sensor. If the predetermined user input is not received in step 430 the method returns to step 420 to continue operation in the first mode as illustrated in FIG. 5. If, however, the user input is received in step 430 then the method moves to step 440.

Figure 7A:
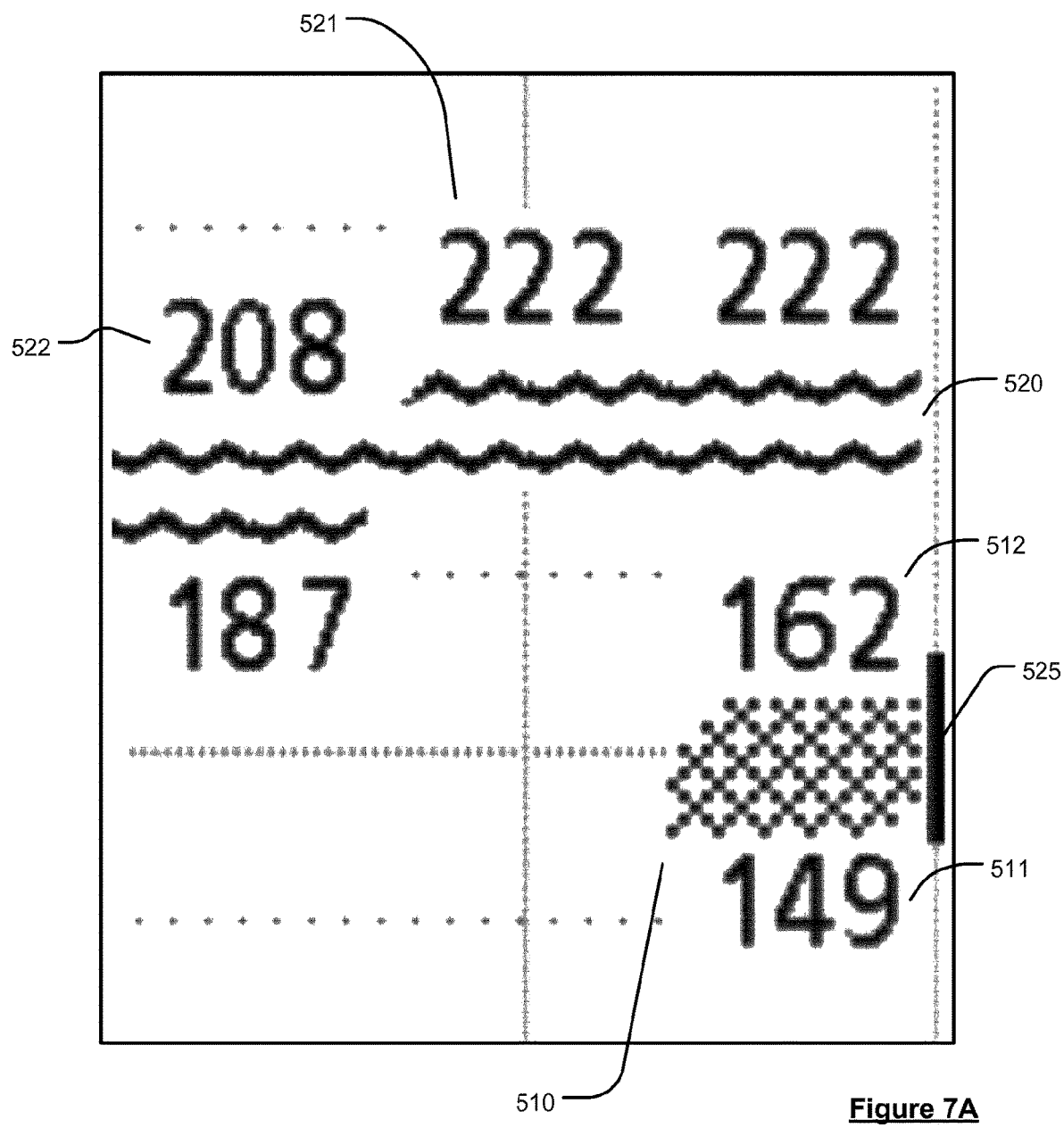
FIGS. 7A to 7C illustrate a display of hazard information in the second mode according to an embodiment of the invention.

In step 440, as illustrated in FIG. 7A, an output of the display window of the display device 210 in a second mode is provided comprising a representation of one or more hazards in a portion of the geographic region of interest, each hazard being associated with at least one item of distance information indicative of a distance of the hazard from the location of the device 200.

Referring to FIG. 6, the output of display device 210 in the first mode shown in FIG. 5 is illustrated with an indication of the portion 600 of the geographic region displayed in the second mode in FIG. 7A. That is, the portion 600 displayed in the second mode in FIG. 7A is a sub-area of the region displayed in the first mode in FIG. 5. Therefore, in the second mode, a viewing scale or magnification level of the displayed region of interest is increased with respect to the first mode. The sub-area 600 may be displayed in the second mode such that it occupies substantially the same area of the display device 210, i.e. the display window, as the region in the first mode.

In some embodiments the portion 600 of the geographic region of the geographic region of interest in the second mode is based on a predetermined location within the geographic region displayed in the first mode and/or a predetermined distance from the current location of the electronic device. For example, the portion 600 may be a portion of the geographic region centred at a distance of 175 yards (or metres) from the current location of the electronic device, such that the portion 600 is a generally central portion of the region of interest displayed in the first mode, as shown in FIG. 6.

Additionally, or alternatively, in some embodiments, step 440 comprises selecting a location of the portion 600 of the geographic region to be displayed in the second mode. That is, determining the location of the portion 600 within the geographic region displayed in the first mode, e.g. determining the distance from the current location of the device at which the portion 600 should be centred. The selecting the location of the portion 600 may comprise determining whether a predetermined number of hazards are located within the portion 600 when located, for example, in the generally central portion 600 of the region of interest as shown in FIG. 6. The predetermined number may be at least one, or may be more than one. If less than the predetermined number of hazards exist within the portion, such as zero hazards, then another location of the portion 600 may be selected. The other location may be selected to encompass at least the predetermined number of hazards or, in another embodiment, a maximum number of hazards that may be encompassed within the portion in the region of interest, i.e. a best location for the portion within the region of interest. It will be appreciated that the location for the portion 600 within the region of interest may be adjusted by the user, as discussed below.

Referring to FIG. 7A, an output 500 of the display device 210 in the second mode according to an embodiment of the invention is illustrated. The display 210 comprises graphical illustrations representative of one or more hazards within the portion 600 of the geographic region of interest. In particular, graphical illustrations representative of the first 510 and second 520 hazards within the sub-region 600 are illustrated. The illustrations are increased in size in the y-direction (height), corresponding to distance from the location of the device 200, and may also be increased in size in the x-direction as compared to the output in the first mode shown in FIG. 5.

Each representation of a hazard 510, 520 in the second mode may be associated with one or more, and preferably a plurality, of items of distance information. For example the illustration representative of the first hazard 510 is associated with first 511 and second items 521 of distance information. Each of the items 511, 512 of distance information are linearly aligned by being present in the same column of the display, namely the right-hand column in the example of FIG. 7 for hazard 510. Each of the plurality of items of distance information 511, 512 is indicative of a distance of a respective part or portion of the hazard 510. In particular, the first distance information 511 is indicative of a distance of a front of the first hazard 510 from the location of the device 200 and the second distance information 512 is indicative of a distance of a rear of the first hazard 510 from the location of the device 200. It will be realised, although not shown in FIG. 7A, that distance information may also be provided indicative of a distance of another part or portion of the hazard, such as a middle of the hazard 510 from the location of the device 200. In one embodiment the distance information indicative of the distance to the middle of the hazard may be super-imposed above the graphical illustration of the hazard 510.

As noted above, in the second mode the illustration representative of each hazard is associated with at least one item of distance information indicative of a distance of the hazard from the location of the device 200. The at least one item of distance information may be indicative of a distance of one or more of a distance of a front, a rear or a middle of the respective hazard 510, 520 from the location of the electronic device. In particular, in some embodiments as illustrated in FIG. 7A, each column of the display 210 containing a representation of a hazard may comprise at least one item of distance information associated with the hazard. For example, the second hazard 520 indicative of the river crossing the fairway comprises first distance information 521 associated with the hazard 520 in a middle column of the display and second distance information 522 associated with the hazard 520 in a left-hand column of the display. In the example of FIG. 7A the first and second distance information 521, 522 associated with the second hazard 520 is indicative of a distance of the rear of the hazard 520 in each column.

It will be noted that, in some embodiments, in the second mode the scale 550 present in the display in the first mode is not present in the second mode. That is, the scale 550 is removed from the display in the second mode in some embodiments.

Figure 7B:
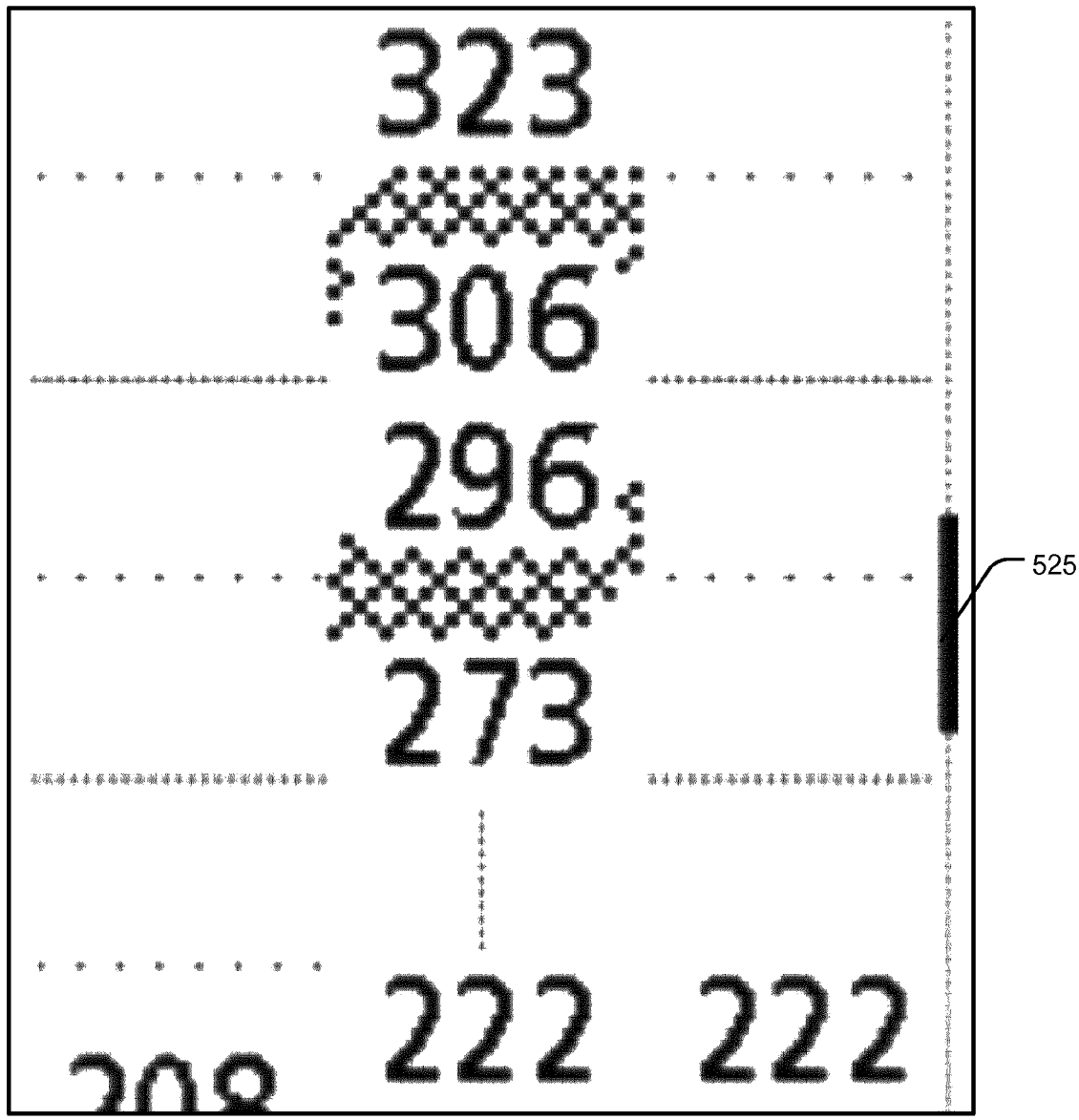
Figure 7C:
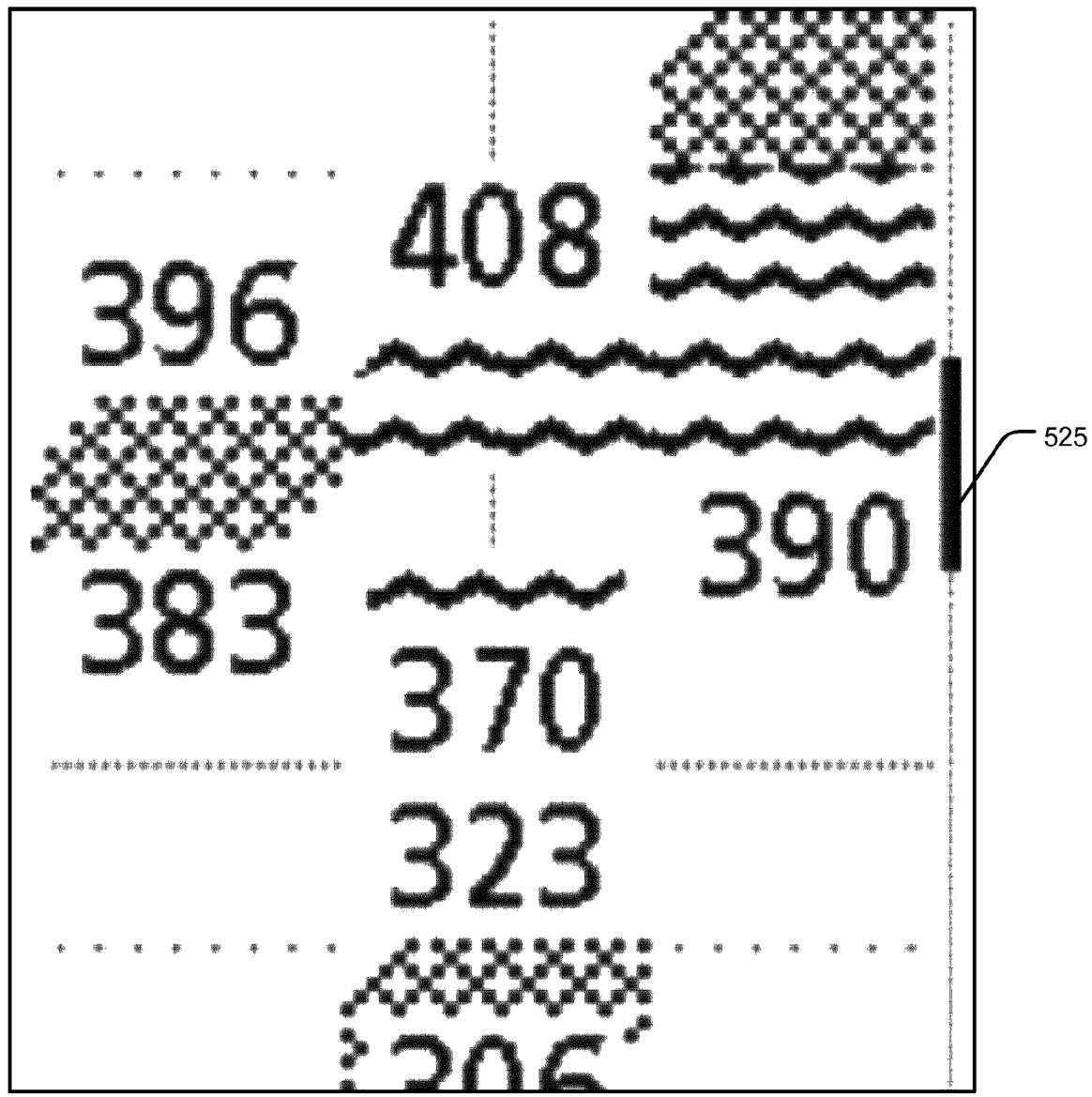

The location of the portion 600 displayed in the second mode may be moved by one or both of the location of the device 200 changing, i.e. the user moving with the device 200, or by a user input to adjust the location of the portion 600 within the region of interest. The user input may be received at the user interface 106 or at the display device 210 where the display device 210 is touch sensitive to provide a direction input moving the location of the portion 600 within the region of interest. In other words, the location of the portion 600 may be manually scrolled within the region of interest according to one or more direction inputs received from the user. This scrolling within the region of interest is shown by FIGS. 7B and 7C, wherein the user has scrolled ahead, as indicated by the position of the scroll bar 525, to see the location of hazards ahead of him or her on the course.

Step 450 comprises determining whether a predetermined user input is received by the device 200. Step 450 allows the user to switch the display 210 back to the first mode as shown in FIG. 5 to thereby allow a view of a greater area or distance of the region of interest. That is, whilst the second mode of the display 210 shown in FIGS. 7A to 7C allows the user to observe precise distances of hazards, and in particular precise distances of respective parts of hazards from the current location, the first mode of the display 210 allows greater appreciation of the general location of hazards in the region of interest. Thus the display output may be toggled between the first and second modes in a convenient manner, even whilst engaged in sport.

In order to again select the first mode, when the device 200 is operative in the second mode, a user input is received at the device 200. The user input may be received at the user interface 106, or may be received at the display device 210 in embodiments where the display device 210 is touch sensitive. The user input may comprise the user touching or pressing on the user interface 106 or display device. The touch may be determined to be between predetermined time limits such as one or both of a minimum and a maximum duration. Advantageously the user input is relatively simple in nature and allows the device 200 to be operated to switch between the second and first modes conveniently when engaged in sport. If the predetermined user input is not received in step 450 the method returns to step 440 to continue operation in the second mode as illustrated in FIGS. 7A to 7C. If, however, the user input is received in step 450 then the method moves to step 460.

In step 460, as discussed above in relation to FIG. 5, in the first mode graphical illustrations of one or more hazards are displayed in relation to the scale 550 indicative of the distance from the location of the electronic device 200.

Advantageously embodiments of the present invention provide a method and apparatus which allows a user to selectively view an indication of hazards according to whether a general awareness of hazards within a region of interest, such as a golf course, or more precise information about the hazards is required such as distance information which may be associated with a part of the respective hazard.

Any of the methods in accordance with the present invention may be implemented at least partially using software e.g. computer programs. The present invention thus also extends to a computer program comprising computer readable instructions executable to perform, or to cause an electronic device to perform, a method according to any of the aspects or embodiments of the invention. Thus, the invention encompasses a computer program product that, when executed by one or more processors, cause the one or more processors to generate suitable images (or other graphical information) for display on a display screen. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of providing hazard information by an electronic device, comprising:
   determining a location of an electronic device in relation to hazards in a geographic region of interest, the location of the electronic device being determined by a location determining unit of the electronic device and the location of the hazards being determined from map data accessible to the electronic device;
   displaying, in a first display mode on a display of the electronic device, an indication of the hazards in the geographic region of interest in relation to a scale indicative of a distance from the location of the electronic device;
   selecting, in response to a user input requesting a transition to a second display mode, a location for a portion of the geographic region of interest from within the geographic region of interest displayed in the first mode, the location being selected so that at least a predetermined number of hazards from among the hazards in the geographic region of interest are located within the portion of the geographic region of interest; and
   displaying, in the second display mode on the display, an indication of one or more of the hazards in the portion of the geographic region of interest in the location, each indication being associated with at least one item of distance information indicative of a distance of the hazard from the location of the electronic device, wherein the indication of the one or more hazards are arranged in the display relative to a path through the region of interest, wherein the region of interest comprises a fairway of a golf course and wherein the path corresponds to a centreline of the fairway.

2. The method of claim 1, wherein in the second mode, a viewing scale of the displayed region of interest is increased with respect to the first mode.

3. The method of claim 2, wherein the viewing scale is increased by a predetermined amount in response to the user input.

4. The method of claim 1 wherein the at least one item of distance information is indicative of a distance of one or more of a front, a middle and a rear of the respective hazard from the location of the electronic device.

5. The method of claim 1 wherein an indication of at least one hazard in the second mode is associated with a plurality of items of distance information.

6. The method of claim 1 wherein in the second mode the distance information is displayed proximal to the indication of the respective hazard.

7. The method of claim 1 wherein in the second mode the distance information is arranged to at least partly overlie the indication of the respective hazard.

8. The method of claim 1 wherein the scale comprises a plurality of items of distance information spaced at regular intervals indicative of a respective distance from the location of the electronic device.

9. The method of claim 1 wherein the portion of the geographic region of interest displayed in the second mode is based on a predetermined location of the region of interest displayed in the first mode and/or a predetermined distance from the current location of the electronic device.

10. The method of claim 1, wherein the distance information is a numerical value indicative of the distance from the location of the electronic device.

11. The method of claim 1, wherein one or more of the indication of each hazard is indicative of a hazard type.

12. The method of claim 1, comprising returning to the first display mode in response to receiving a further predetermined user input whilst in the second display mode.

13. An electronic device comprising one or more processing resources configured to:
   determine a location of the electronic device in relation to hazards in a geographic region of interest, the location of the hazards being determined from map data accessible to the electronic device;
   display, in a first display mode on a display of the electronic device, an indication of the hazards in the geographic region of interest in relation to a scale indicative of a distance from the location of the electronic device;
   select, in response to a user input requesting a transition to a second display mode, a location for a portion of the geographic region of interest from within the geographic region of interest displayed in the first mode, the location being selected so that at least a predetermined number of hazards from among the hazards in the geographic region of interest are located within the portion of the geographic region of interest; and
   display, in the second display mode on the display, an indication of one or more of the hazards in the portion of the geographic region of interest in the location, each indication being associated with at least one item of distance information indicative of a distance of the hazard from the location of the electronic device, wherein the indication of the one or more hazards are arranged in the display relative to a path through the region of interest, wherein the region of interest comprises a fairway of a golf course and wherein the path corresponds to a centreline of the fairway.

14. The electronic device of claim 13, further comprising a strap, such that the electronic device is configured to be worn on a wrist of the user.

15. A non-transitory computer readable medium having a computer program product comprising instructions which, when executed by at least one processor of an electronic device, cause the electronic device to
   determine a location of the electronic device in relation to hazards in a geographic region of interest, the location of the hazards being determined from map data accessible to the electronic device;
   display, in a first display mode on a display of the electronic device, an indication of the hazards in the geographic region of interest in relation to a scale indicative of a distance from the location of the electronic device;
   select, in response to a user input requesting a transition to a second display mode, a location for a portion of the geographic region of interest from within the geographic region of interest displayed in the first mode, the location being selected so that at least a predetermined number of hazards from among the hazards in the geographic region of interest are located within the portion of the geographic region of interest; and
   display, in the second display mode on the display, an indication of one or more of the hazards in the portion of the geographic region of interest in the location, each indication being associated with at least one item of distance information indicative of a distance of the hazard from the location of the electronic device, wherein the indication of the one or more hazards are arranged in the display relative to a path through the region of interest, wherein the region of interest comprises a fairway of a golf course and wherein the path corresponds to a centreline of the fairway.

* * * * *